(12) United States Patent
Heitlinger et al.

(10) Patent No.: US 7,845,151 B2
(45) Date of Patent: Dec. 7, 2010

(54) APPARATUS PREFERABLY FOR HORTICULTURE AND/OR PARKS

(75) Inventors: Bernhard Anton Heitlinger, Pandrup (DK); Henrik Jonstrup, Pandrup (DK)

(73) Assignee: Mowon I/S v/Henrik Jonstrup & Bernhard Anton Heitlinger, Pandrup (DK)

( * ) Notice: Subject to any disclaimer, the term of this patent is extended or adjusted under 35 U.S.C. 154(b) by 0 days.

(21) Appl. No.: 12/083,116

(22) PCT Filed: Oct. 4, 2006

(86) PCT No.: PCT/DK2006/000551

§ 371 (c)(1),
(2), (4) Date: Aug. 8, 2008

(87) PCT Pub. No.: WO2007/038929

PCT Pub. Date: Apr. 12, 2007

(65) Prior Publication Data

US 2009/0031685 A1  Feb. 5, 2009

(30) Foreign Application Priority Data

Oct. 4, 2005   (DK) ................................ 2005 01386

(51) Int. Cl.
*A01D 75/30* (2006.01)
(52) U.S. Cl. .......................................................... 56/7
(58) Field of Classification Search ............... 56/6, 56/7, 249, 14.7, 14.9, 15.2, 15.9, 16.3, 134, 56/159, 228
See application file for complete search history.

(56) References Cited

U.S. PATENT DOCUMENTS

| 3,058,280 | A |   | 10/1962 | Lewis |   |
|---|---|---|---|---|---|
| 4,478,026 | A | * | 10/1984 | Mullet et al. | 56/7 |
| 5,076,044 | A |   | 12/1991 | Shattuck |   |
| 6,058,687 | A | * | 5/2000 | Short | 56/7 |
| 6,098,388 | A |   | 8/2000 | Davies |   |
| 6,698,171 | B2 | * | 3/2004 | Doerflinger | 56/7 |

FOREIGN PATENT DOCUMENTS

| EP | 1405556 | 7/2004 |
|---|---|---|
| GB | 16105 | 0/1915 |
| GB | 1542661 | 3/1979 |
| WO | WO03/005800 | 1/2003 |

* cited by examiner

*Primary Examiner*—Robert E Pezzuto
(74) *Attorney, Agent, or Firm*—James Creighton Wray; Meera P. Narasimhan

(57) ABSTRACT

An apparatus (1) preferably for horticulture and/or parks, comprises a main drawbar (2) for connection to a vehicle (28), and the main drawbar (2) is connected to a number of garden tools (3, 11, 27), wherein the main drawbar (2) is pivotally connected to a central point (4) of a tool holder (5), which tool holder (5) is arranged in a position behind the garden tool (3) and above the main drawbar (2) and each end part of the tool holder (5) is connected to a forwardly directed flange (6), which is pivotally connected to an end part of the garden tool (3).

24 Claims, 10 Drawing Sheets

APPARATUS PREFERABLY FOR HORTICULTURE AND/OR PARKS

This application claims the benefit of Danish Application No. PA 2005 01386 filed Oct. 4, 2005 and PCT/DK2006/000551 filed Oct. 4, 2006, which are hereby incorporated by reference in their entirety.

FIELD OF THE INVENTION

The present invention relates to an apparatus preferably for horticulture and/or parks, comprising a main drawbar for connection to a vehicle, where the drawbar is connected to a number of garden tools.

BACKGROUND OF THE INVENTION

In public parks, large gardens, sports facilities such as stadiums and the like, and golf courses large lawns need constant care due to aesthetic appearance or the application of the lawn. First of all the lawn must be mowed regularly especially during summer to keep the lawn short.

Several different types of lawn mowers may be used to cut the grass. The simplest kind of lawn mower is the manual reel mower, which is pushed by a person.

Powered mowers utilise some kind of engine to rotate the cutting blades. Engines may be of the electrical or internal combustion type. A powered push mower is the simplest type of powered mower—the engine rotates the cutters, while a person pushes the mower forward.

Internal combustion engines applied to lawn mowing are almost invariably of the four-strokes or two strokes variety using gasoline (e.g. petrol) as fuel. Internal combustion engines used with lawn mowers are usually provided with only one cylinder. The power ranges from 2 to 6 horsepower (1.5 to 4.5 kW). The engines are usually carburetted and require a manual pull to start them, although an electric start may also be applied.

During the last fifty or so years electrically powered mowers have existed, however, the disadvantage of these lawn mowers are that they require a trailing power cord, which limits their range, thus they are only suitable for relatively small lawns as a power socket is essential.

A pull mower is essentially the same as a manually pushed mower, however, the propulsion unit pulls the mowing unit instead of pushing it. It is the same principal behind a tractor or an animal drawn mower.

An alternative mechanism for cutting grass is a horizontally spinning blade held close above the grass surface. This type is usually referred to as a rotary mower. One of the first companies to exploit this principle commercially was the Australian Victa company, in 1947. Usually, these mowers are moved by manual motive power—the on-board engine or motor only spins the blades. The most common type is fitted with wheels, rotary mowers typically have an opening in the side of the housing, where the cut grass is expelled. Some have a grass catcher attachment at that point to bag the grass clippings. Rear-catchers are another common design for the same purpose.

Hover mowers are powered rotary push mowers that use a turbine above the spinning blades to drive air downwards, thereby creating an air cushion that lifts the mower off the ground. The operator can then easily move the mower as it floats over the grass.

Hover mowers are necessarily light to achieve the air cushion and typically have plastic bodies with an electric motor, although small petrol engines have been used. A different style of movement is often employed with hover mowers whereby operators swing the mower in an arc around themselves because there are no wheels touching the ground to impede movement in sideway directions.

Hover mowers can also be applied to very long grass and even light scrub, since with their lightness, most operators are able to lift the mower up and then let it sink slowly down while the blades progressively chop up the vegetation (when lifted, of course the air cushion disappears). The lifting action is made even easier when the mower is swung around with the handle held against the operator's mid-body to provide leverage.

Professional grass-cutting equipment (used by large establishments such as universities or local authorities, etc) usually takes the form of much larger dedicated ride-on platforms or attachments that can be mounted on a standard tractor unit or behind ("gang-mower"). Either type may use rotating blades or the cylindrical blade type cutters.

There are two main types of cutting mechanisms:
- those where a set of spiral-cylindrical blades spins on a horizontal axis (reel mower). The cutting is done in a scissor like manner between the moving spiral blades and a single stationary horizontal blade. The axle is attached to a gear, which is mounted on one of the wheels to spin the blades rapidly to obtain a good grass cutting action even when the mower moves slowly.
- those where a number of blades spin horizontally on a vertical drive shaft (rotary mower). The mechanism cuts the grass as horizontal blades strike the grass at high speed.

On rotary mowers the blade is seldom sharp enough to cut the grass blades. The speed of the blade simply tears the grass resulting in brown tips. By contrast, the cylinder-type lawnmowers and manual lawnmowers usually work by scissor action on the blades and a cleaner cut is achieved. Hence it is advantageous to use the reel mower when the appearance of the lawn is essential, e.g. golf courses, parks or the like.

In case large lawns need to be mowed it is impossible to use an ordinary domestic lawn mower, as this takes up too much time and is physically strenuous for the person operating the lawn mower.

To ease the burden of lawn moving the lawnmower may be self-propelled using its own engine. Thus the person doing the lawn moving only needs to steer the lawn mower in the right direction. However, it still takes up too much time to mow a large lawn.

To save time it is obvious to apply lawnmowers, which are pushed or pulled by a vehicle e.g. a tractor, a mini-tractor or an ATV. Typically, a number of wide lawnmower modules are attached to a vehicle in an overlapping pattern or the lawnmower has a substantial width, hence it is possible to cut wide lanes of the lawn during one passing of the vehicle.

The drawbacks of the above reel lawnmowers are that:
- The width of the lawnmower or lawnmower modules makes it necessary to maintain a small distance between the moving spiral blades and the single stationary horizontal blade, hence reducing the cutting efficiency. If the moving spiral blades and the single stationary horizontal blade are maintained very close, heat generation occurs in the single stationary horizontal blade when the lawnmower or lawnmower modules are driven rapidly ahead. If overheated the single stationary horizontal blade folds and thereby damages the moving spiral blades and prevents them from cutting any grass.
- The width of the lawnmower or lawnmower modules can prevent even cutting of an uneven lawn, because the moving spiral blades and the single stationary horizontal blade are fixed between the wheels of the lawnmower or lawnmower modules.

OBJECT OF THE INVENTION

It is an object of the present invention to provide an apparatus preferably for horticulture and/or parks, by which it is possible to perform an optimised cutting of grass by means of the apparatus working at high speed.

A further object of the present invention is to provide an apparatus by means of which it is possible to perform an even treatment of an underlying possibly uneven surface.

Yet another object of the present invention is to provide an apparatus, which is a simple mechanical structure.

This can be obtained by an apparatus as described in the preamble of claim 1 and where the main drawbar is pivotally connected to a central point of a tool holder, which tool holder is arranged in a position behind the garden tool and above the main drawbar and each end part of the tool holder is connected to a forwardly directed flange, which is pivotally connected to an end part of the garden tool.

DESCRIPTION OF THE INVENTION

In one embodiment of the present invention the apparatus comprises a main drawbar for connection to a vehicle, and the drawbar is connected to a number of garden tools, and the main drawbar is pivotally connected to a central point of a tool holder, which tool holder is arranged in a position behind the garden tool and above the main drawbar and each end part of the tool holder is connected to a forwardly directed flange, which is pivotally connected to an end part of the garden tool.

In a preferred embodiment of the present invention the drawbar is provided with a number of coupling flanges each adapted to pivotally connect of one or more tool drawbars, each of which are pivotally connected to a central point of a tool holder, which tool holder is arranged in a position behind a garden tool and above the tool drawbar and each end part of the tool holder is connected to a forwardly directed flange, which is pivotally connected to an end part of the garden tool.

The particular arrangement of having the tool holder arranged behind the tool, in particular when the tool is a lawnmower module provides a number of advantages in combination with the forwardly directed flanges, connecting the tool to the tool holder. The pulling action applied to the main drawbar will due to this arrangement be a pushing action, transferred to the tool via the forwardly directed flanges. As all reel mowers are pushed the inventive construction provides for pushing action, just as the reel mower was designed to be operated.

The apparatus is pulled by a vehicle e.g. a tractor, a mini-tractor or an ATV, however, as the tool holder is arranged in a position behind the garden tool and above the main drawbar and each end part of the tool holder is connected to a forwardly directed flange, each individual garden tool is being pushed forward.

The shape of the forwardly directed flange secures optimal transfer of power. Tests have shown that the optimal angle of the forwardly directed flange is approximately 131 degrees, when the garden tool is a reel mower; hence the reel mower is being pushed like a manually operated domestic reel mower.

The pivotal connections between the main drawbar and a central point of a tool holder, the tool drawbar and a central point of a tool holder, the main drawbar and the tool drawbars and/or the forwardly directed flange and the garden tool ensures that the garden tools of the apparatus follows the uneven ground, hence it is possible to obtain an even treatment of an uneven underlying surface.

If the apparatus is used for cutting grass, the garden tools are reel lawnmowers. To prevent the single stationary horizontal blade from being damaged or folded, due to overheating of the single stationary horizontal blade because of friction between the moving spiral blades and the single stationary horizontal blade, the width of the reel lawnmowers/reel lawnmower modules ranges between 20 and 70 cm. Hence it is possible to drive the lawnmower at a substantial speed while at the same time closely maintaining the moving spiral blades and the single stationary horizontal blade, which results in optimal cutting of the grass at a high speed.

If the apparatus is used for cutting grass the garden tools are reel lawnmowers, each of which are similar to a conventional domestic reel lawnmower. A minor structural conversion is necessary and these reel lawnmowers can easily be attached to the forwardly directed flange of the tool holder. Hence the apparatus is a simple mechanical structure provided with a number of reel lawnmowers attached to a main drawbar, which is drawn by a vehicle.

The coupling flanges are attached to both sides of the main drawbar, hence it is possible to attach one or more tool drawbars on both side. Typically, the apparatus has a symmetrical configuration, thus the same number of garden tools is arranged on each side of the main drawbar.

To keep the garden tool close to the ground while driving the lawnmower at high speed and while passing minor obstacles on the ground, the tool holder comprises a cavity, which is filled with a heavy material e.g. sand, stones, concrete or the like. Furthermore, because of the weight and the position of the tool holder above and behind the garden tool the reel mower cuts the grass optimally.

As it is possible to attach a number of garden tools to the apparatus, the tool drawbar, which in one end is connected to the main drawbar, may be of a substantial length. To ensure smooth operation of the apparatus the drawbars comprise one or more support wheels to support the tool drawbar.

When using the apparatus the garden tools are spread out behind the vehicle making it possible to e.g. cut a wide lane of the lawn in one passing of the vehicle. The large width of the apparatus is advantageous when mowing a lawn. However, when trans-porting the apparatus from one area to another e.g. via public roads, forest/park paths or the like a very wide apparatus is disadvantageous as it takes up a lot of space on the public roads or narrow forest/park paths making it difficult for cars or persons to pass. Hence the tool drawbars comprise two parts, which are connected by a joint, and the end parts of the parts connecting in the joint are provided with angled contact surfaces.

The joint allows a part of the tool drawbars to move upward and fold towards and/or past the main drawbar. Hence it is possible to reduce the width of the apparatus during transport.

The angled contact surfaces ensure that each tool drawbars are folded towards the main drawbar in different angles, hence it is possible to arrange the folded tool drawbars with garden tools in rows above the main drawbar.

To apply the apparatus according to the present invention for different purposes the garden tools are one or more of the following:

a reel lawnmower for cutting grass, a drum for compacting the ground, thereby levelling the surface, an aerator for aeration of a ground surface causing oxygen to access the roots of e.g. the grass, a seeder for sowing seeds into the ground, a rake for levelling the ground or removing e.g. grass, stones, leafs or the like, a harrow for soil growing, or a moss remover for reaming moss from the lawn.

To ensure even treatment of the ground in the wake of the apparatus the garden tools are arranged in partially overlapping rows behind the vehicle. Hence a garden tool in a second row is placed right behind the space between two garden tools in a first row, thus ensuring that the apparatus performs an even treatment of the surface in spite of any unevenness.

To manufacture the apparatus according to the present invention so that it applies to different needs and sizes, the garden tools are of a modular design and/or of varying width. Hence it is possible to assemble an apparatus having a specific width and/or function.

In one embodiment of the present invention the garden tools and or the joint of the tool drawbars are automatically activated through a hydraulic system or an electric system. Hence it is possible to operate the garden tools and or the joint of the tool drawbars from the control cabin of the vehicle. It is not necessary to leave the control cabin of the vehicle to fold the apparatus into a driveable size or to lift the garden tools from the ground.

A particular embodiment of the invention has a special configuration due to the construction of the device. This embodiment is particularly useful when a relatively large number of garden tools are to be arranged on the same device. Also this embodiment is particularly useful, when hydraulic lifting means are installed. The embodiment is particular in that attached to the main draw bar are intermediate draw bars such that the main draw bar will have a substantial cross configuration. In one end of the cross attachment means are provided for attaching the device to a vehicle, and at the opposite end a pivotable connection is provided for attachment to an extension of the main draw bar onto which garden tools as explained above may be attached. The arms of the cross are intermediate draw bars, which in their terminal ends also are provided with pivotable means. The extension of the intermediate draw bars are provided with support wheels and coupling flanges and tool draw bars as explained above and below with respect to the detailed description of a particular embodiment.

With this configuration it is possible to activate for example hydraulic means such that the intermediate draw bars will be folded around the pivotable joint, whereby the garden tools arranged on the intermediate draw bars will be lifted from the ground. Furthermore, by providing a pivotable joint as explained above and in particular with reference to FIG. 7 below, the configuration of the joint is such that the outermost section of the intermediate draw bars will fold substantially on the device itself such that the garden tools attached to the intermediate draw bar which is folded on top will superpose or substantially superpose the garden tools arranged at the extension at the main draw bar. In this manner it is possible also with the help of the support wheel attached to the intermediate draw bar to have a substantial number of garden tools attached by means of one main draw bar to a pulling vehicle. At the same time due to the configuration of the joint (see particular description with reference to FIG. 7) the garden tools may be folded onto themselves such that the apparatus as such only has a very limited width extension when being stored. Also during use it is possible to lift one section by a pivot around a joint arranged in the intermediate draw bar in order to take into account rocks, trees and the like being placed in the path where treatment of the surface is to be applied.

DESCRIPTION OF THE DRAWING

In the following the invention will be explained in more detail with reference to the accompanying drawing, where.

DETAILED DESCRIPTION OF THE INVENTION

Figure 1:
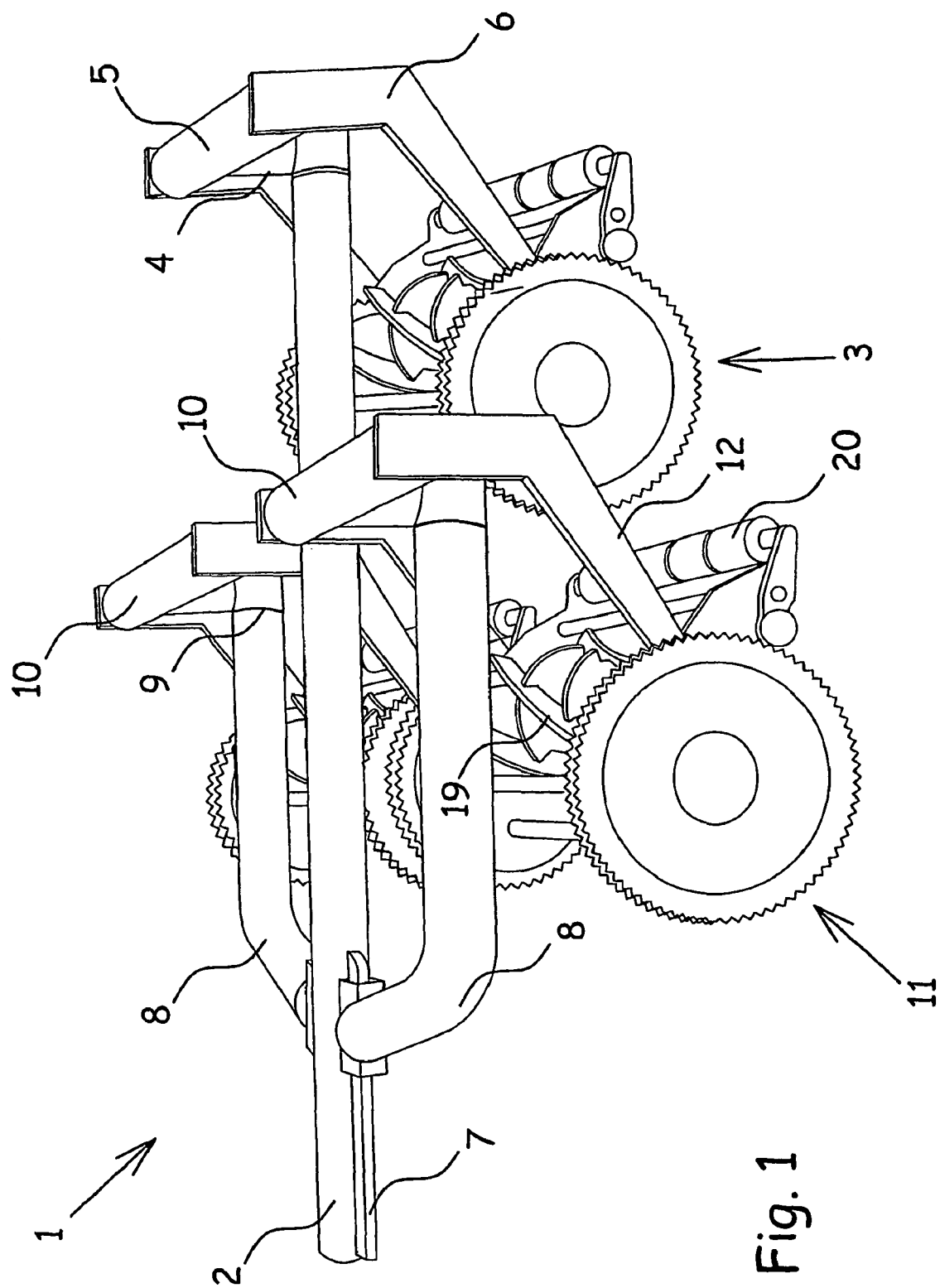
FIG. 1-2 shows an apparatus according to the present invention.
Figure 2:
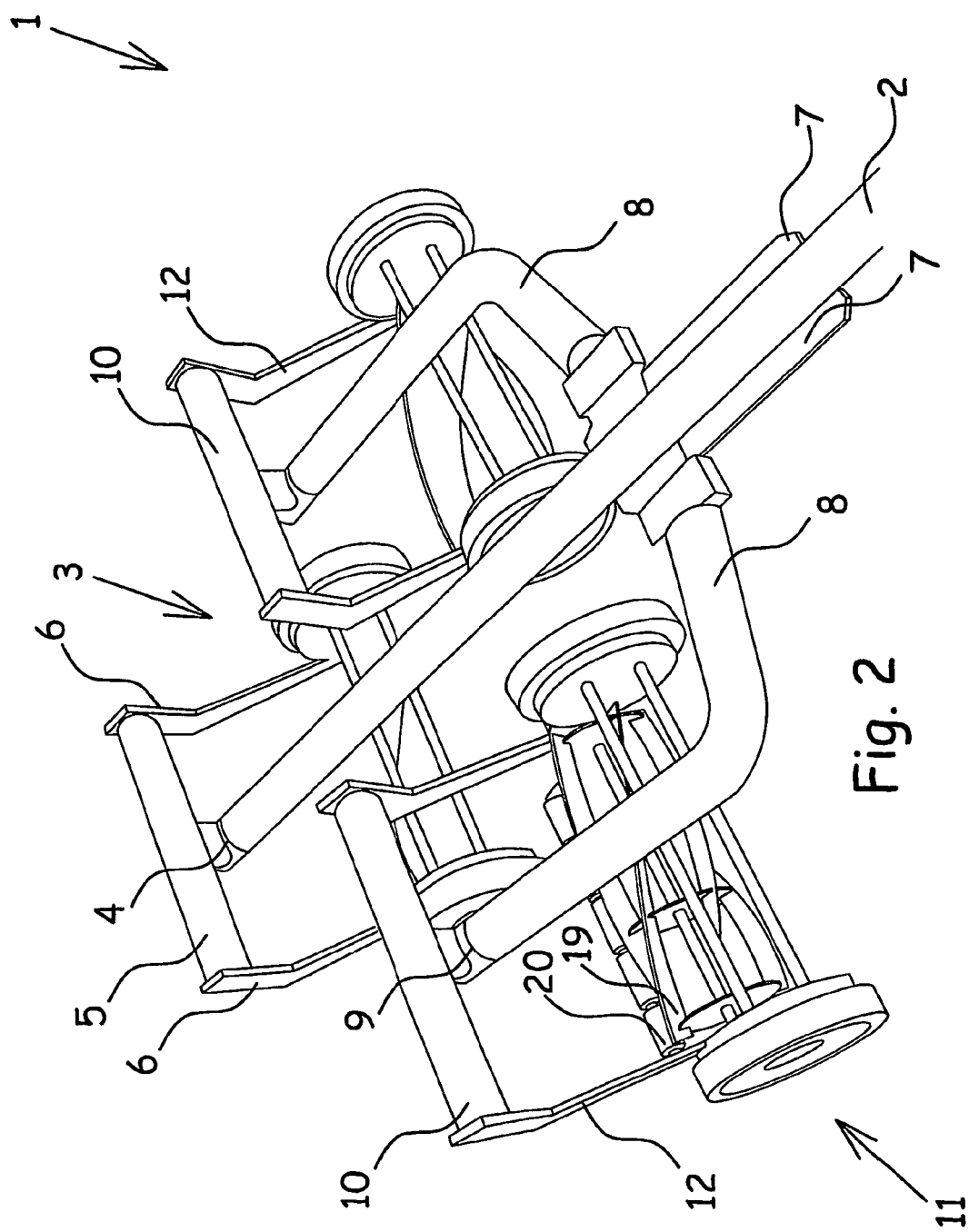

FIG. 1-2 shows an apparatus 1 according to the present invention, which apparatus 1 comprises a main drawbar 2 for connection to a vehicle (not shown), and the main drawbar 2 is connected to a reel lawnmower 3.

The main drawbar 2 is pivotally connected to a central point 4 of a tool holder 5, which is arranged in a position behind the reel lawnmower 3 and above the main drawbar 2. The tool holder 5 is connected to forwardly direct flanges 6, which are pivotally connected to the reel lawnmower 3.

The main drawbar 2 is provided with coupling flanges 7 adapted for the pivotal connection of tool drawbars 8, each of which each are pivotally connected to a central point 9 of a tool holder 10.

The tool holder 10 is arranged in a position behind a reel lawnmower 11 and above the tool drawbar 8. The tool holder 10 is connected to forwardly direct flanges 12, which are pivotally connected to the reel lawnmower 11

It is possible to see that each reel lawnmower 3, 11 is to be pushed forward in such a manner that the moving spiral blades 19 and/or the single stationary horizontal blade (not shown) is positioned level with the following rollers 20.

Figure 3:
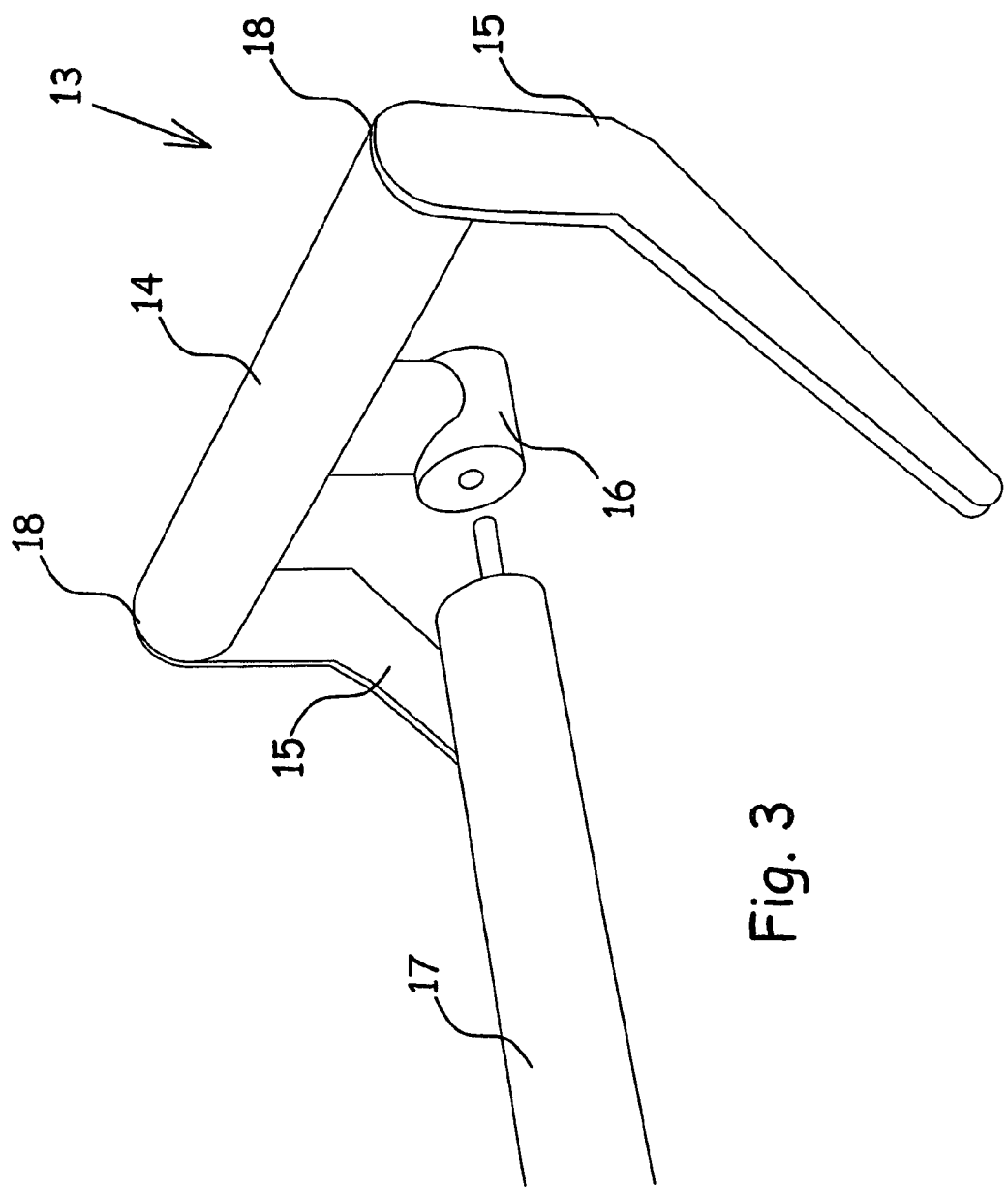
FIG. 3 shows a tool holder arrangement.

FIG. 3 shows a tool holder arrangement 13, which comprises a tool holder 14 with end parts 18 connected to forwardly directed flanges 15, which are adapted for pivotal connection with a garden tool (not shown).

The tool holder 14 is positioned above the drawbar 17 and is pivotally connected to the drawbar via connecting piece 16.

Figure 4:
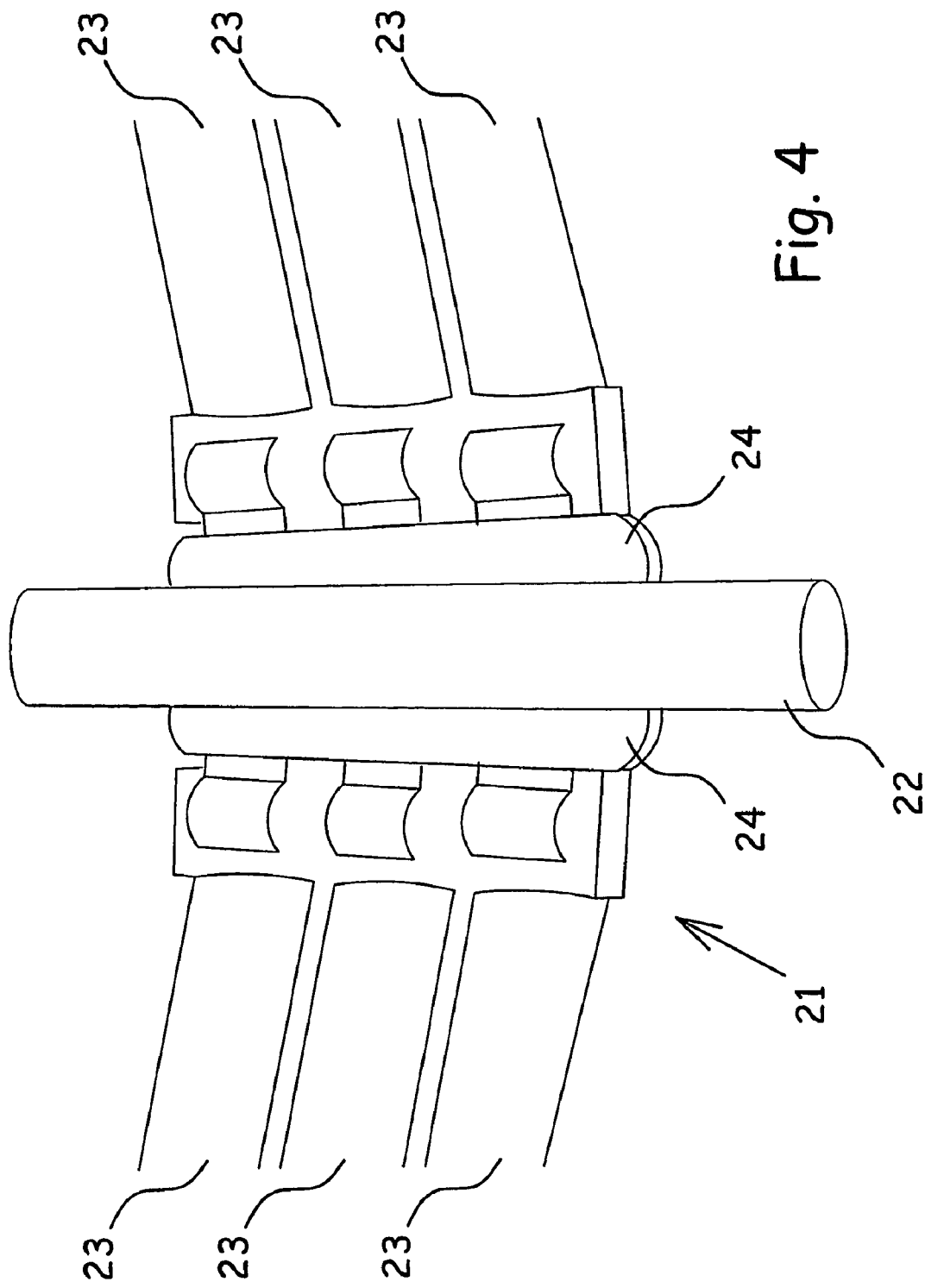
FIG. 4 shows a joint between the main drawbar and the tool drawbars.

FIG. 4 shows a joint 21 between the main drawbar 22 and the tool drawbars 23. The main drawbar 22 is provided with coupling flanges 24 each of which are adapted for pivotal connection to the tool drawbar 23.

Figure 5:
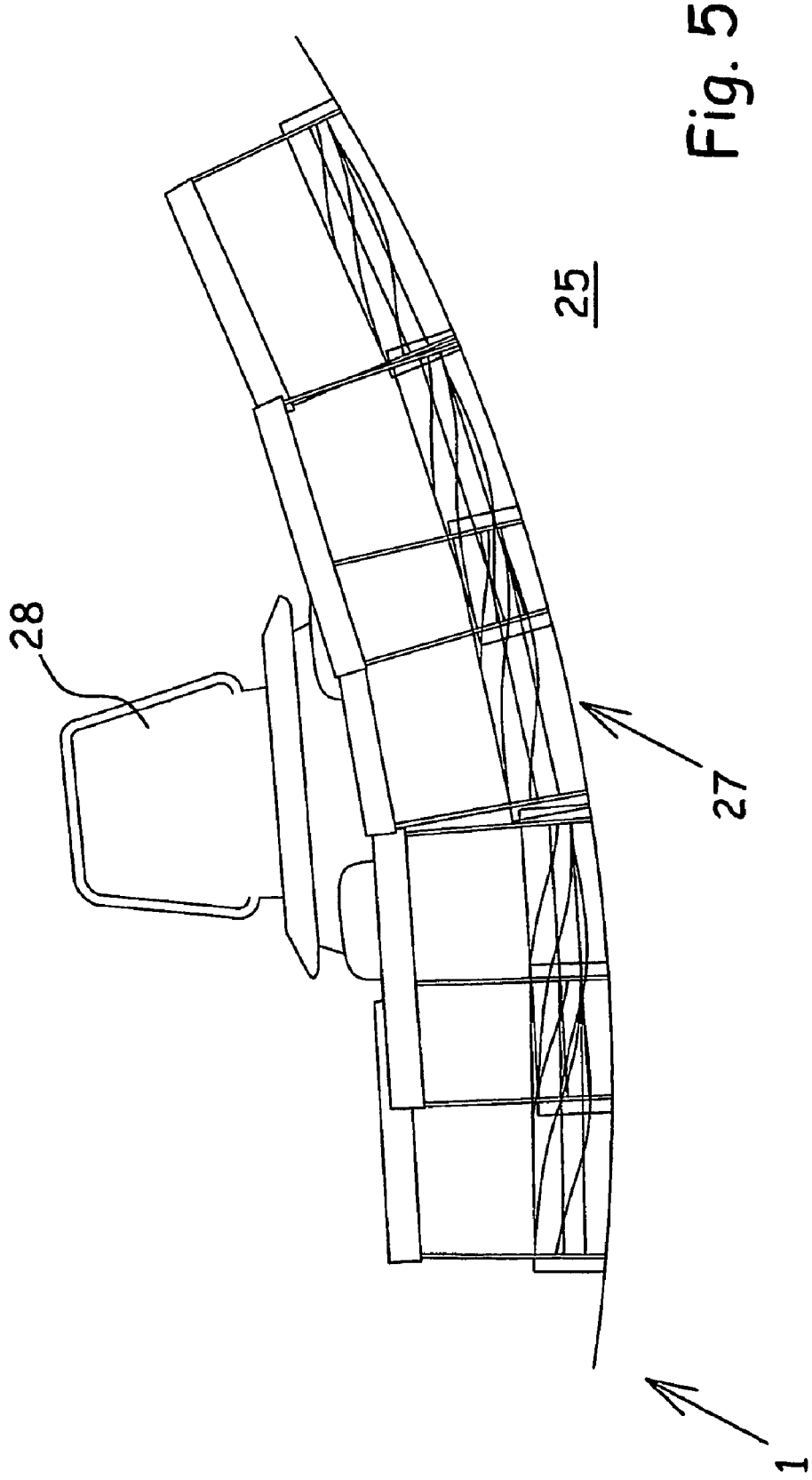
FIG. 5-6 shows the apparatus on an uneven surface.
Figure 6:
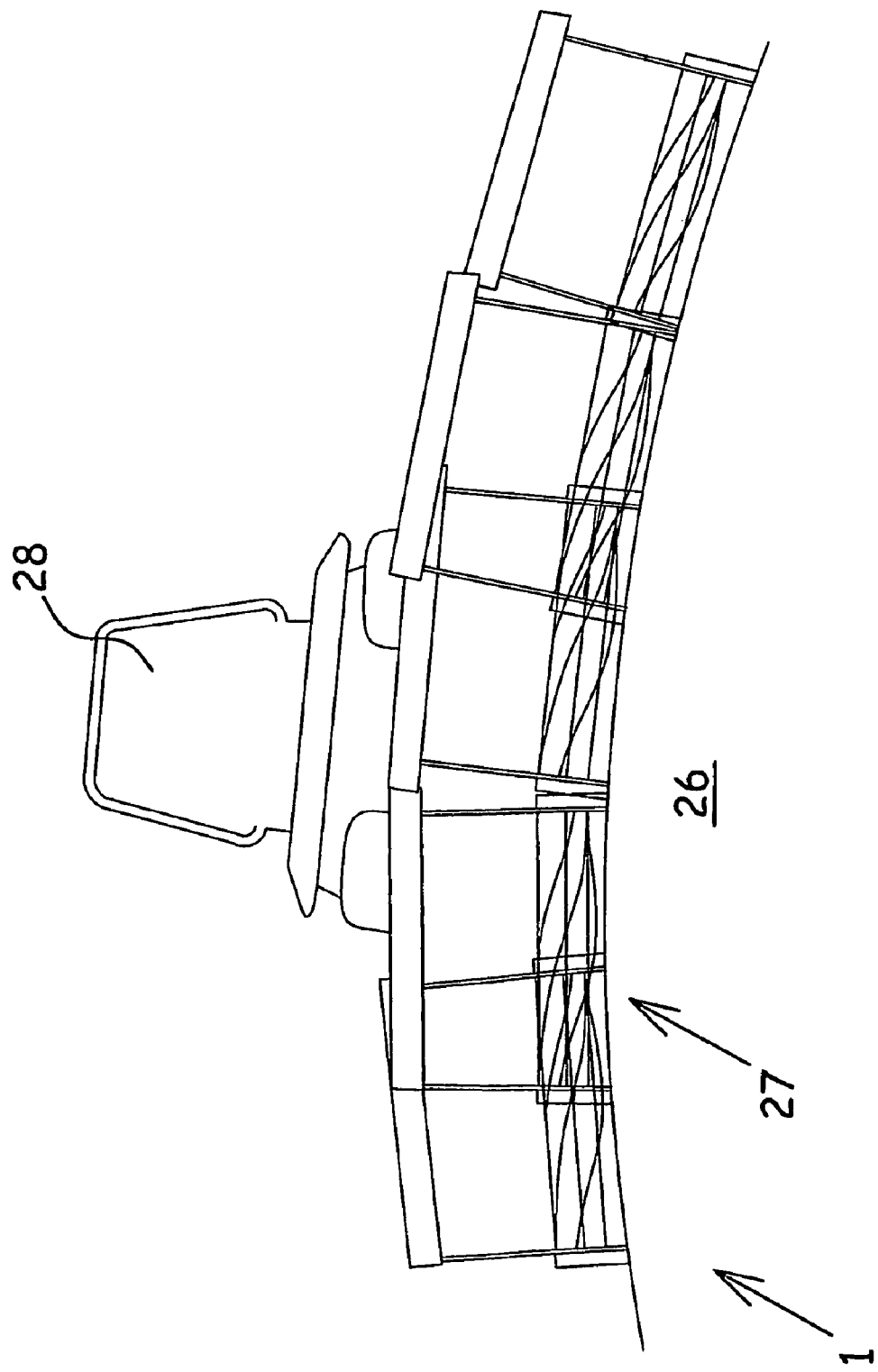

FIG. 5-6 shows the apparatus 1 on an uneven surface 25, 26 and it is possible to see that all of the reel lawnmowers 27 of the apparatus 1 follows the uneven surface 25, 26, hence even cutting of the grass occurs. The apparatus 1 is drawn by a mini tractor 28.

Figure 7:
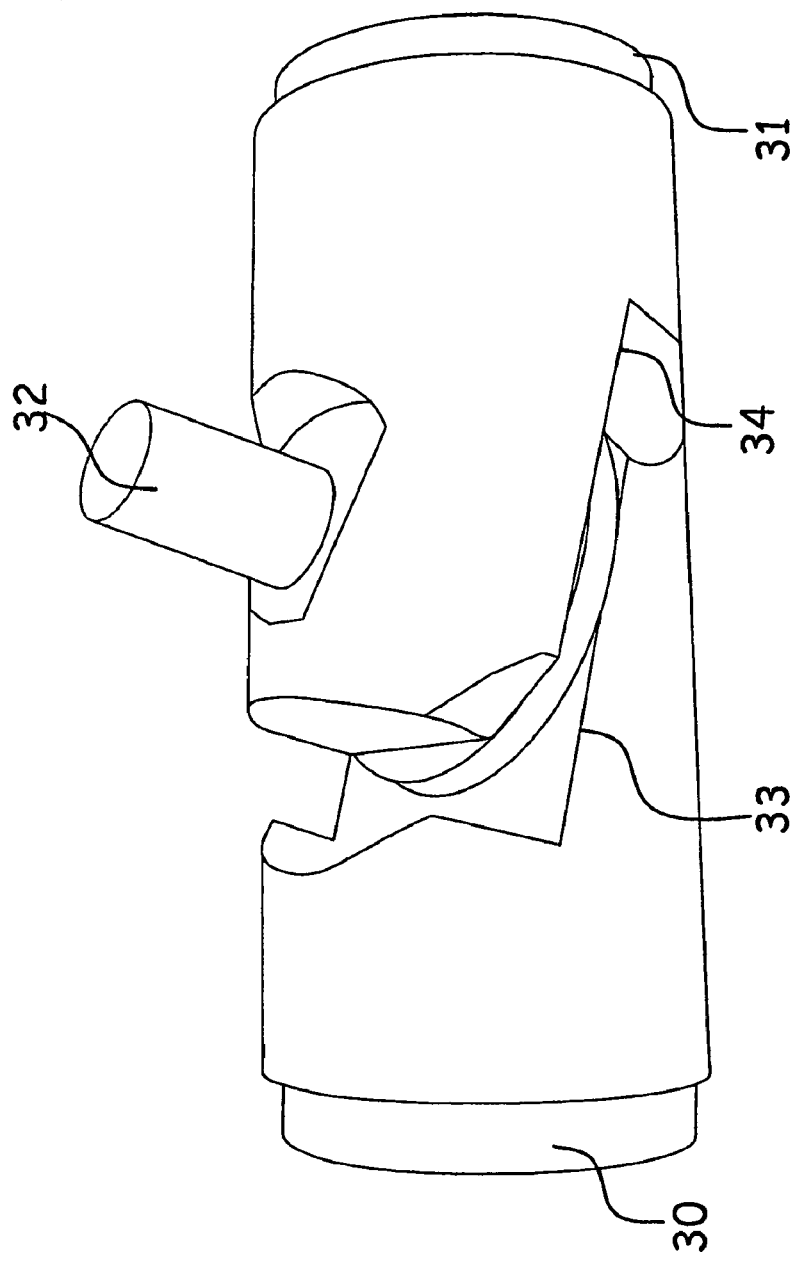
FIG. 7 shows a joint for a tool drawbar.

FIG. 7 shows a joint 29 for a tool drawbar (not shown) comprising two parts 30, 31 which are connected by a joint 32 and where the end parts of the parts connecting in the joint 32 are provided with angled contact surfaces 33, 34, hence it is possible to fold the tool drawbar (not shown), when transporting the apparatus (not shown) on e.g. public roads, forest/park paths.

Figure 8:
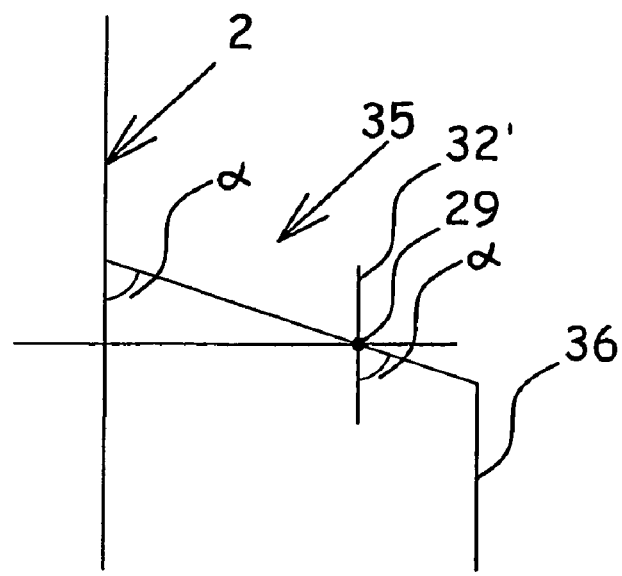
FIG. 8 schematic drawing of principle.
Figure 9:
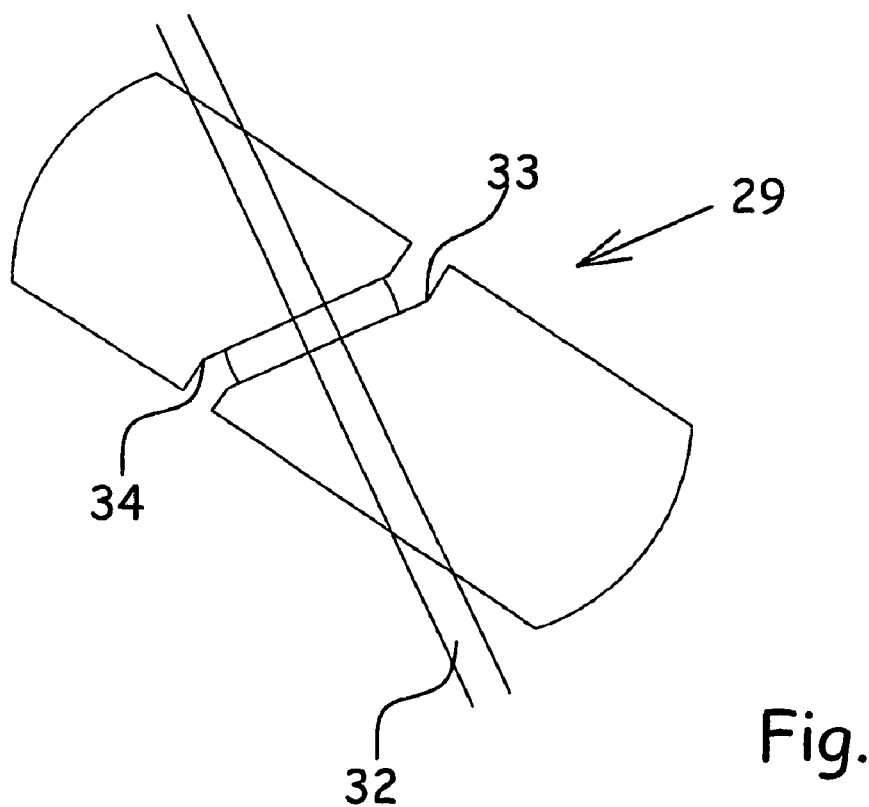
FIG. 9 shows a cross section of FIG. 7.

The principle for use of the joint according to FIG. 7 is illustrated in FIGS. 8 and 9. In FIG. 8 is schematically illustrated the concept of inserting the joint 29 in the structure where a main draw bar 2 is equipped with an intermediate draw bar 35. Due to the arrangement of the axis 32 in the joint 29 coincidental with the axis 32', the intermediate draw bar 35 will, when the section 36 of the intermediate draw bar 35 is folded around the joint 29 due to the orientation of the axis 32', be folded such that the section 36 is parallel and close to the main draw bar 2 of course depending on the exact position of the joint 29. With reference to FIG. 9 the cross section through a joint 29 as depicted in FIG. 7 is illustrated.

Figure 10:
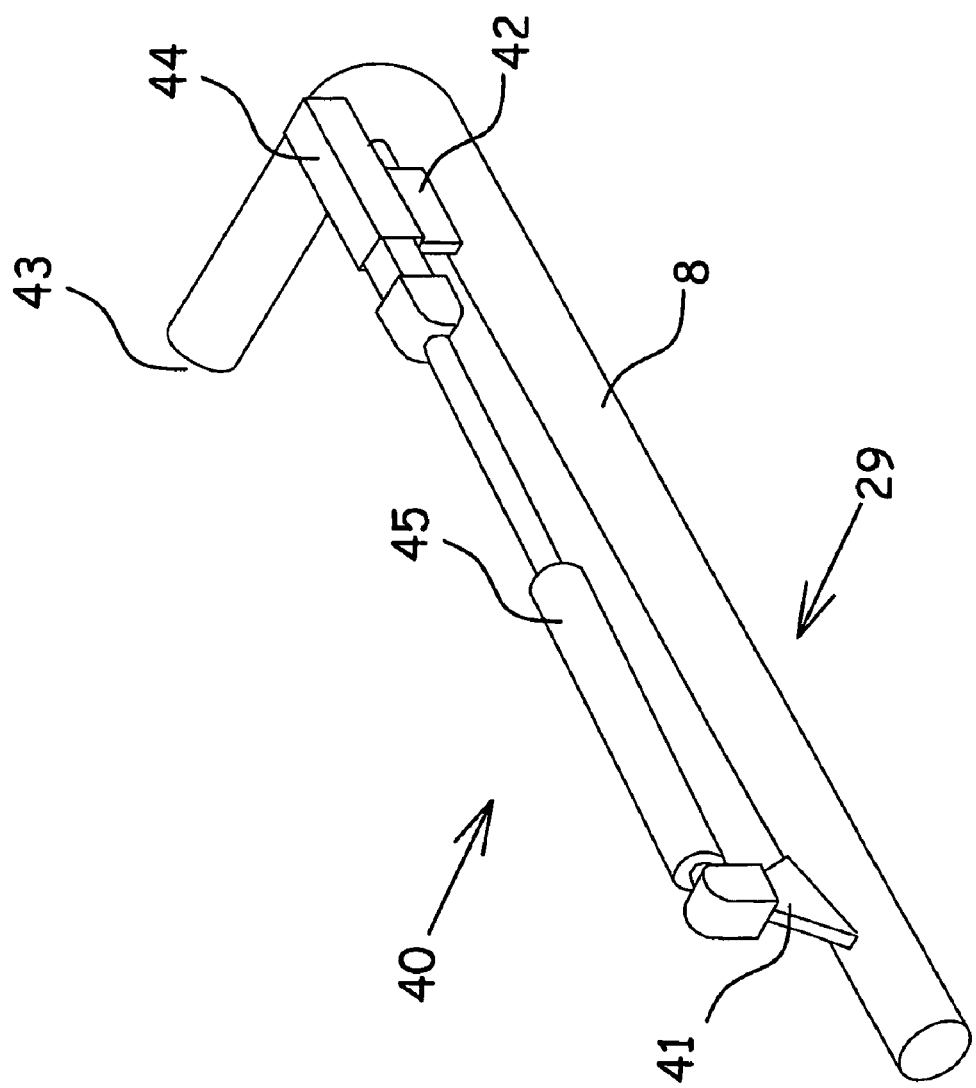
FIG. 10 shows a drawbar with a hydraulic lifting system.

In FIG. 10 is illustrated a hydraulic lifting system 40, which for the larger models, as for example illustrated in FIGS. 5 and 6, makes it possible to raise the tools (not illustrated) and fold the device successively onto itself, by folding one arm 8 after the other, due to the hinge construction 29, as explained in detail with reference to FIGS. 8 and 9, such that the width of the entire device may be reduced from the width as illustrated in FIGS. 5 and 6 to a width being only slightly wider than the centrally arranged tool device.

The hydraulic system 40 comprises a main cylinder 45 attached to flanges 41,42, which flanges 41,42 are arranged on either side of the hinge 29. All hydraulic hoses, connections etc are not illustrated as these are of ordinary type. By activating the system 40, the arm 8 will be elevated and at the same time due to the hinge construction swung, in this example backwards, thereby making room for other tools to be swung in line with the device.

As is depicted in FIGS. 5 and 6 the relatively short width of the reel lawnmower devices (see 19 in FIG. 2) provides the device 1 with an adaptability in relation to the contours of the surfaces to be mowed, and at the same time due to the relatively narrow width, and the overlap between adjacent tools, for a perfect cut. Had the cutters been wider they would tend to cut shorter in the middle and leave it longer at the sides (tangent to a circle).

For the larger systems employing hydraulic systems 40 the system will typically in its extended position as illustrated in FIG. 10, have a substantially straight drawbar 8. As the device 1 is suitable to run at relatively high speeds, as explained above, it is desirable to place a tool arranged in one end 43 of the drawbar 8 such that it "floats", i.e. is able to correct its orientation in relation to the contours of the surface without having to activate the hydraulic system. For this purpose resilient displacement means 44 for example in shape of a guided spring or resilient member, placed between the flange 41,42 and the hydraulic cylinder 45 is provided. The resilient means, may for example be a spring arranged around an axle, which axle has a stop in one end and which axle is coupled to the hydraulic cylinder in the other end. In this manner the spring urges the axle in one direction, but still leaves maneuverability, whereby the hinge will allow the drawbar to be angled +/−15 degrees out of the linearity.

Figure 11:
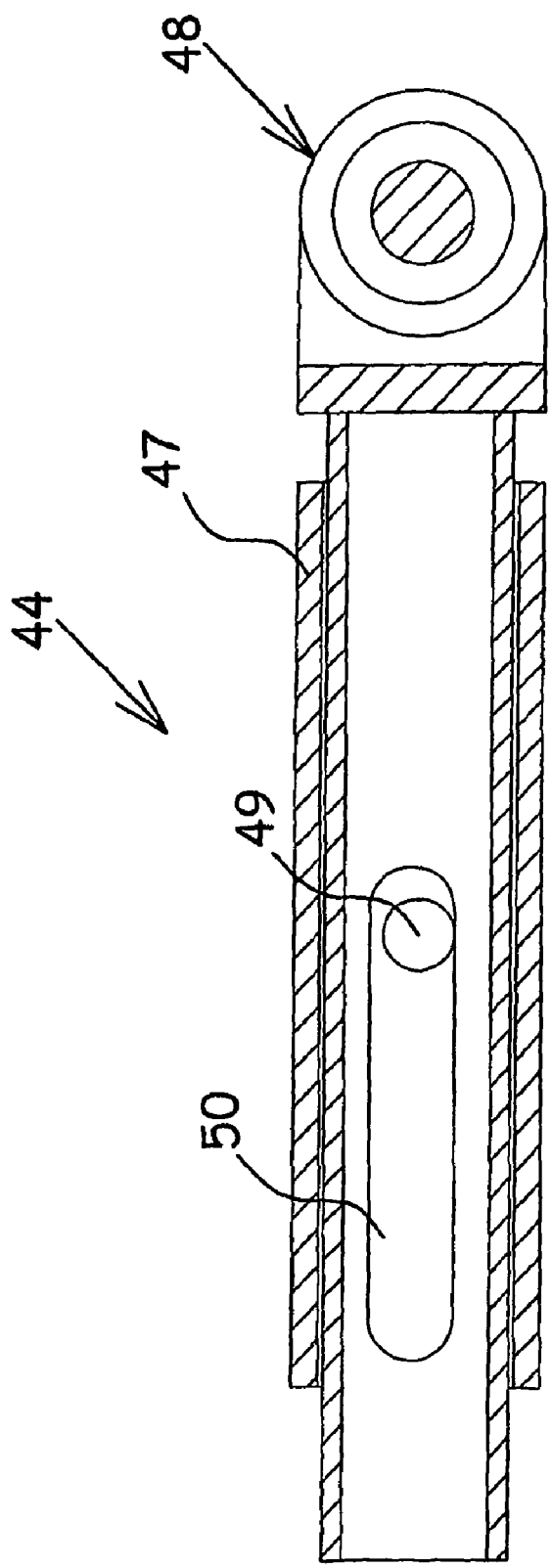
FIG. 11 shows a cross section through a resilient displacement means.

In FIG. 11 is illustrated a cross section of one way of providing the "floating" ability of the tool. The resilient displacement means 44 comprises an outer housing 47, coaxially inside of which an inner member 48 is arranged. The outer housing is by means of a flange (not shown) fastened to the drawbar. The inner member is by means of eye part 48 connected to the hydraulic cylinder (not shown). In the outer housing is provided a pin 49. In the inner member 48 is provided with a longitudinally slot 50, allowing the pin 49 to slide back and forth in said slot 50. As the 49 is fastened to the outer housing 47, the slot allows the eye part 48 to be displaced relative to the outer housing a distance corresponding to the length of the slot. A spring (not illustrated may be arranged in order to dampen the relative movement between the outer housing 47 and the inner member 48.

The hydraulic system is coupled to a central control unit, such that as an operator initiates the folding sequence of the tools into their raised position, the folding will be carried out in a special pre-defined sequence, in order to allow the devices 19 to be packed as tightly as possible.

The invention claimed is:

1. Apparatus (1) for horticulture and parks, comprising a main drawbar (2) for connection to a vehicle (28), a tool holder having a central point and end parts, wherein the main drawbar (2) is connected to a number of garden tools (3, 11, 27), wherein the main drawbar (2) is pivotally connected to the central point (4) of the tool holder (5) such that the tool holder is rotatable in a plane perpendicular to a direction of the main drawbar and thereby a working direction of the device, wherein the tool holder (5) is arranged in a position behind the number of garden tools (3) and above a plane of the main drawbar (2) and each end part of the tool holder (5) is connected to a forwardly and downwardly directed flange (6) pivotally connected to an end part of any of the number of the garden tools (3).

2. Apparatus (1) according to claim 1, wherein the main drawbar (2, 22) is provided with a number of coupling flanges (7, 24) each of which are adapted to pivotally connect one or more tool drawbars (8, 23), which are pivotally connected to a central point (9) of an additional tool holder (10, 14), wherein the additional tool holder (10, 14) is arranged in a position behind an additional number of garden tools (11) and above the tool drawbar (8, 23) and each end part (18) of the additional tool holder (10, 14) is connected with a forwardly directed flange (12, 15) pivotally connected to an end part of any of the additional number of the garden tools (11).

3. Apparatus (1) according to claim 2, wherein each tool holder (5, 10, 14) comprises a cavity filled with a heavy material.

4. Apparatus (1) according to claim 2, wherein the one or more tool drawbars (8, 17, 23) comprise one or more support wheels.

5. Apparatus (1) according to claim 2, wherein the one or more tool drawbars (8, 17, 23) each comprise two parts (30, 31) which are connected by a joint (32) and wherein the end parts (30, 31) connecting in the joint (32) are provided with angled contact surfaces (33, 34).

6. Apparatus (1) according to claim 1, wherein the number of the garden tools are one or more of the following: a reel lawnmower (3, 11, 27), a drum, an aerator, a seeder, a rake, a harrow or a moss remover.

7. Apparatus (1) according to claim 1, wherein the number of the garden tools (3, 11, 27) are arranged in partial overlapping rows behind the vehicle (28).

8. Apparatus (1) according to claim 1, wherein the number of the garden tools (3, 11, 27) are of a modular design.

9. Apparatus (1) according to claim 5 wherein the number of the garden tools (3, 11, 27) are automatically activated through a hydraulic system or an electric system.

10. Apparatus according to claim 9, wherein the hydraulic system (40) includes a hydraulic cylinder (45) fastened with one end on either side of the joint (29) by means of flanges (41,42) and that at least one of the fastenings includes resilient displacement means (44), allowing the drawbar (8,23) to angle up to +/−15 degrees in the joint (29).

11. Apparatus (1) according to claim 8, wherein the number of the garden tools (3, 11, 27) are of the modular design of varying width.

12. Apparatus (1) according to claim 9, wherein the joint (29) of the tool drawbars (8, 23) are automatically activated through a hydraulic system or an electric system.

13. An apparatus for horticulture and parks comprising a main drawbar for coupling to a vehicle, a first plurality of garden tools coupled to the main drawbar, first tool holders each comprising a first central point and first end points, the main drawbar being pivotally connected to the first central point of the tool holder, the tool holder being disposed behind the first plurality of the garden tools and above a plane of the main drawbar, and first forwardly and downwardly directed flanges connected to the first end points of the first tool holder and pivotally connected to an end part of any of the first plurality of the garden tools.

14. The apparatus of claim 13, further comprising a second plurality of garden tools, second tool holders each comprising a second central point and second end points, one or more tool drawbars each pivotally connected to the second central point, and a plurality of coupling flanges on the main drawbar, each coupling flange being adapted to pivotally connect to the one or more tool drawbars, the second tool holders being disposed behind the second plurality of the garden tools, above positions of the one or more tool drawbars and above the position of the main drawbar, and second forwardly directed flanges connected to the second end points of the second tool holders and pivotally connected to an end part of any of the second plurality of the garden tools.

15. The apparatus of claim 14, wherein each tool holder comprises a cavity filled with a heavy material.

16. The apparatus of claim 14, wherein each tool drawbar comprises one or more support wheels.

17. The apparatus of claim 14, wherein each tool drawbar comprises two parts, a joint coupling the two parts, and a complementary angled contact surface on each of the two parts for coupling the two parts with the joint.

18. The apparatus of claim 14, wherein each of the first and the second plurality of the garden tools are selected from the group consisting of reel lawnmowers, drums, aerators, seeders, rakes, harrows, moss removers, and combinations thereof.

19. The apparatus of claim 14, wherein the first and the second plurality of the garden tools are arranged in partial overlapping rows behind the vehicle.

20. The apparatus of claim 14, wherein any of the first and the second plurality of the garden tools are of a modular design.

21. The apparatus of claim 17, wherein the first and the second plurality of the garden tools are automatically activated through a system selected from the group consisting of hydraulic systems, electric systems, and combinations thereof.

22. The apparatus of claim 21, wherein the hydraulic system comprises a hydraulic cylinder comprising flanges on one end having fastenings on either side of the joint and at least one fastening including resilient displacement means allowing the one or more tool drawbars to angle up to +/−15 degrees in the joint.

23. The apparatus of claim 17, wherein the joint of the tool drawbars is automatically activated through a system selected from the group consisting of hydraulic systems, electric systems and combinations thereof.

24. The apparatus of claim 20, wherein the modular design has varying widths.

* * * * *